UNITED STATES PATENT OFFICE 2,210,900

INSECTICIDAL SPRAY

Gerald H. Coleman, Midland, Mich., assignor to The Dow Chemical Company, Midland, Mich., a corporation of Michigan No Drawing. Application July 31, 1939, Serial No. 287,624

11 Claims. (Cl. 167—24)

This invention concerns insecticidal spray compositions particularly adapted for combating flies, mosquitoes, moths, and similar insects.

Extracts of such insecticidal plant products, as pyrethrum flowers, derris, cubé, barbasco, and the like, are widely used for the control of household insect pests. These toxicants are generally employed in petroleum distillate sprays. Pyrethrin-containing sprays have a quick paralyzing action on flies but give a relatively low kill as compared to the per cent knockdown. With rotenone-containing compositions a high "moribund kill" is generally obtained and a considerable period of time is required to destroy insect pests. The plant extracts, generally, are unstable to heat and light and lose their effectiveness to a considerable degree upon storage.

I have discovered that certain aryloxy-polyalkylene ether chlorides are efficient substitutes for extracts of insecticidal plant products in spray compositions. Solutions of such synthetic ether compounds compare favorably in toxic effect with the plant extracts and have the added advantage of being substantially colorless and odorless and being stable to heat, light, and air. Furthermore, small amounts of the aryloxy-polyalkylene ether chlorides may be added to solutions of insecticidal plant products containing such products as pyrethrin and rotenone to obtain improved fly spray compositions which are more stable to heat and light and have a greater paralyzing effect and greater lethal effect on insects than do the original extract-containing compositions. By employing these synthetic ether compounds to fortify such known spray compositions, economies are effected by reducing the amount of pyrethrin or rotenone required.

When the aryloxy-polyalkylene ether chlorides are used alone, a concentration from about 2 to 10 per cent by weight in an inert organic solvent is satisfactory. For use in stabilizing and/or fortifying a common fly spray composition comprising pyrethrin or rotenone, the aryloxy ether compound is employed in amount of from 0.5 to 5 grams per 100 milliliters of the spray solution. The term "aryloxy" as herein employed refers to aromatic-oxy radicals of the benzene series as obtained by the elimination of hydrogen from the hydroxyl grouping of monohydric phenols which may contain such inert substituents as alkyl, halogen, aryl, aralkyl, cycloalkyl, alkoxy, and the like.

The aryloxy-polyalkylene ether chlorides I have found valuable as insecticidal toxicants and stabilizers in spray compositions are those having the following formula:

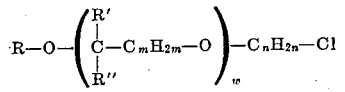

wherein R represents an aromatic radical, R' and R'' represent hydrogen or methyl, $m$ is an integer not greater than 3, $w$ is 2 or 3, and $n$ is not greater than 4. The most effective group of compounds within this genus are those in which R has the following formula:

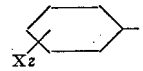

wherein X represents hydrogen, alkyl, or halogen, and $z$ is an integer not greater than 5. The above compounds may be prepared by reacting a monohydric phenol, particularly an alkyl and/or halogen substituted phenol, with a dichloro-polyalkylene ether, e. g. beta-(2-chloro-ethoxy)-beta'-chloro-diethyl ether, beta-beta'-di-(2-chloro-ethoxy)-diethyl ether, gamma-(2-chloro-propoxy)-gamma'-chloro-dipropyl ether, beta-(2-chloro-propoxy)-beta'-chloro-dipropyl ether, gamma-gamma'-(3-chloro-propoxy)-dipropyl ether, delta-(4-chloro-butoxy)-delta'-chloro-dibutyl ether, beta-beta'-di-(2-chloro-2-2-dimethyl-ethoxy)-di-(2-2-dimethyl-ethyl) ether, or the like, in the presence of water and a suitable alkali, e. g. NaOH, KOH, etc., and under such conditions of temperature and pressure as favor the replacement of a single halogen atom by the "aryloxy radical." The aryloxy-polyalkylene ether chlorides with which this invention is concerned are for the most part viscous liquids substantially odorless, colorless, and comparatively innocuous to human beings and warm-blooded animals. Particularly advantageous is the fact that they do not cause irritation and dermatitis upon contact with living tissue and skin.

The method employed in determining the insecticidal toxicity of solutions of the above compounds and combinations thereof with pyrethrin and rotenone is substantially that described in Soap 8, No. 4, 1932 and known as the Peet Grady method. For purpose of comparison in the examples a control pyrethrin solution was employed consisting of the extract of the toxic principle from 1 pound of pyrethrum flowers dissolved in 1 U. S. gallon of the petroleum distillate having a boiling range of 345°–508° F. and a flash point of 137° F.

The invention is illustrated by the following examples:

Example 1

Beta-phenoxy-beta'-(2-chloro-ethoxy)-diethyl ether (boiling at 162°–163° C. at 3 mm. pressure) was dissolved in the petroleum distillate as employed in the control solution in amount sufficient to give a 3 per cent by volume solution. This solution was employed as a spray composition against three-day old houseflies, according to the Peet Grady method, and found to give a knockdown of 99 per cent in 10 minutes and a kill of 41 per cent in 48 hours. In a similar manner other aryloxy-polyalkylene ether chlorides were dissolved in the petroleum distillate and tested against houseflies. The following table sets forth representative data obtained:

Table

| Compound | Percent by volume | Knockdown in 10 mins. | Kill in 48 hours |
| --- | --- | --- | --- |
| Beta-(4-chloro-phenoxy)-beta'-(2-chloro ethoxy)-diethyl ether (boiling at 184°–185° C. at 4 mm. pressure) | 3 | 71 | 34 |
| Beta-(2.4.6-trichloro-phenoxy)-beta'-(2-chloro-ethoxy)-diethyl ether (boiling at 197°–198° C. at 3 mm. pressure) | 3 | 85 | 56 |
| Beta-(4-tertiary-butyl-phenoxy)-beta'-(2-chloro-ethoxy)-diethyl ether (boiling at 190°–191° C. at 4 mm. pressure) | 3 | 88 | 61 |
| Control solution | | 98 | *50 |

* Average of 6 runs.

The test solutions containing the synthetic ether compounds were substantially odorless, non-irritating, and colorless, and did not decompose or deteriorate on storage and exposure to light and air.

Example 2

In a similar manner tests were carried out upon spray compositions comprising 2.5 grams of various aryloxy-polyalkylene ether chlorides and 50 milligrams of pyrethrin per 100 milliliters of petroleum distillate. In these compositions the synthetic ether chloride fortified the pyrethrin and also stabilized the composition against decomposition by heat, light, and air. The following table sets for data obtained with solutions of representative compounds against five-day old houseflies.

Table

| Compound | Knockdown in 10 mins. | Kill in 48 hours |
| --- | --- | --- |
| Beta-(2.4.6-trichloro-phenoxy)-beta'-(2-chloro-ethoxy)-diethyl ether | 98.9 | 46 |
| Beta-phenoxy-beta'-(2-chloro ethoxy)-diethyl ether | 99.1 | 54 |
| Beta-(4-methyl phenoxy)-beta'-(2-chloro-ethoxy)-diethyl ether (boiling at 182°–184° C. at 6 mm. pressure) | 100 | 63 |
| Control solution (containing (100 milligrams pyrethrin per 100 milliliters solution) | 99 | 39 |

By substituting other aryloxy-polyalkylene ether chlorides for those disclosed in the foregoing examples, insecticidal compositions may be obtained of comparable efficiency in the control of household and related insect pests. Representative of such compounds are beta-(2-phenoxy-ethoxy)-beta'-(2-chloro-ethoxy)-diethyl ether boiling at 190°–196° C. at 3 mm. pressure, and having a specific gravity of 1.139 at 25°/25° C.; beta-(2-sym.-trichloro-phenoxy-ethoxy)-beta'-(2-chloro-ethoxy)-diethyl ether boiling at 207°–210° C. at 1 mm. pressure, and having a specific gravity of 1.334 at 25°/25° C.; and beta-(2-para-chloro-phenoxy-ethoxy)-beta'-(2-chloro-ethoxy)-diethyl ether boiling at 195°–199° C. at 1 mm. pressure, and having a specific gravity of 1.213 at 25°/25° C. Other compounds which may be employed similarly include those derived from the ortho, meta, and para phenyl phenol, ortho, meta, and para cyclohexyl phenols, guaiacol, 2-chloro-4-tertiary-amyl phenol, 2.4.6-tribromo-phenol, penta-chloro phenol, ortho and para benzyl phenols, naphthol, tetrahydro-naphthol, and the like, by reaction with di-(chloro-alkoxy)-alkanes and di-(chloro-alkoxy)-dialkyl ethers to obtain aryloxy-polyalkylene ether chlorides in which the alkylene groups may be of straight or branched chain configuration.

Mixtures of the above compounds may also be employed to obtain liquid spray materials having desirable characteristics as regards insecticidal toxicity and stability to light and heat. Likewise the aryloxy-polyalkylene ether chlorides may be employed to fortify and stabilize extracts of derris, cubé, barbasco, and the like. Besides petroleum distillates, other organic solvents, such as benzene, ethylene-chloride, hydrogenated naphthalene, butyl alcohol, methyl ethyl ketone, may be employed. The phrase "non-corrosive organic solvent" as employed in the following claims refers to any organic solvent material unreactive with and capable of dissolving the toxicants described and non-injurious to the skin and general health of humans.

Other modes of employing the principle of my invention may be employed instead of those explained, change being made as regards the materials or the amounts thereof employed, provided the compositions defined by any of the following claims or their equivalents be employed.

I therefore particularly point out and distinctly claim as my invention:

1. An insecticidal spray comprising a non-corrosive organic solvent having dissolved therein as the principal toxic ingredient a compound having the formula

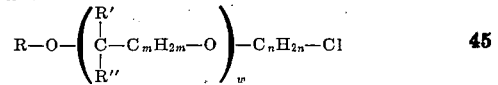

wherein R represents an aromatic radical, R' and R'' represent a member of the group consisting of hydrogen and methyl, w is one of the integers 2 and 3, m is not greater than 3, and n is not greater than 4.

2. An insecticidal spray comprising a non-corrosive organic solvent having dissolved therein a product selected from the class consisting of the extracts of pyrethrin- and rotenone-bearing plants, and as an added toxicant and stabilizer an aryloxy-polyalkylene ether chloride having the following formula

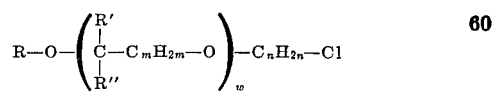

wherein R represents an aromatic radical, R' and R'' represent a member of the group consisting of hydrogen and methyl, w is one of the integers 2 and 3, m is not greater than 3, and n is not greater than 4.

3. An insecticidal spray comprising a petroleum distillate having dissolved therein as the principal toxic ingredient an aryloxy-polyalkylene ether chloride having the formula $$R-O-(CH_2CH_2-O)_w-CH_2CH_2-Cl$$

wherein R represents an aromatic radical, and w is one of the integers 2 and 3.

4. An insecticidal spray comprising a petroleum distillate having dissolved therein as the principal toxic ingredient an aryloxy-polyalkylene ether chloride having the formula

wherein R represents an aromatic radical.

5. An insecticidal spray comprising a non-corrosive organic solvent having dissolved therein as the principal toxic ingredient a compound having the formula

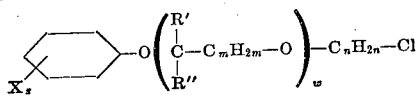

wherein X represents a member of the group consisting of hydrogen, alkyl, and halogen, $z$ is an integer not greater than 5, R' and R'' represent a member of the group consisting of hydrogen and methyl, $w$ is one of the integers 2 and 3, $m$ is not greater than 3, and $n$ is not greater than 4.

6. An insecticidal spray comprising a non-corrosive organic solvent having dissolved therein a product selected from the class consisting of the extracts of pyrethrin- and rotenone-bearing plants, and as an added toxicant and stabilizer an aryloxy-polyalkylene ether chloride having the formula

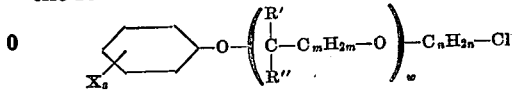

wherein X represents a member of the group consisting of hydrogen, alkyl, and halogen, $z$ is an integer not greater than 5, R' and R'' represent a member of the group consisting of hydrogen and methyl, $w$ is one of the integers 2 and 3, $m$ is not greater than 3, and $n$ is not greater than 4.

7. An insecticidal spray comprising a petroleum distillate having dissolved therein as the principal toxic ingredient a compound having the formula

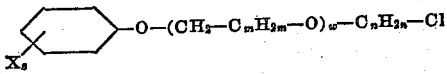

wherein X represents a member of the group consisting of hydrogen, alkyl, and halogen, $z$ is an integer not greater than 5, $w$ is one of the integers 2 and 3, $m$ is not greater than 3 and $n$ is not greater than 4.

8. An insecticidal spray comprising a petroleum distillate having dissolved therein as the principal toxic ingredient a compound having the formula

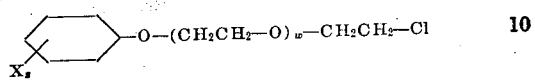

wherein X represents a member of the group consisting of hydrogen, alkyl, and halogen, $z$ is an integer not greater than 5, and $w$ is one of the integers 2 and 3.

9. An insecticidal spray comprising a petroleum distillate having dissolved therein as the principal toxic ingredient a compound having the formula

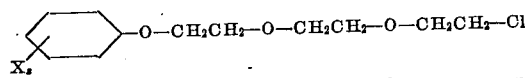

wherein X represents a member of the group consisting of hydrogen, alkyl, and halogen, and $z$ is an integer not greater than 5.

10. An insecticidal spray comprising a petroleum distillate having dissolved therein as the principal toxic ingredient a compound having the formula

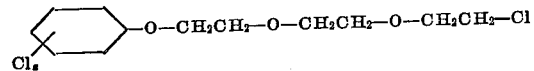

wherein $z$ is an integer not greater than 5.

11. An insecticidal spray comprising a petroleum distillate having dissolved therein as the principal toxic ingredient a compound having the formula

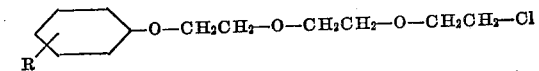

wherein R represents an alkyl radical containing from 1 to 8 carbon atoms, inclusive.

GERALD H. COLEMAN.